(12) United States Patent
Bayrakeri et al.

(10) Patent No.: US 7,127,737 B1
(45) Date of Patent: Oct. 24, 2006

(54) BANDWIDTH MANAGEMENT TECHNIQUES FOR DELIVERY OF INTERACTIVE PROGRAM GUIDE

(75) Inventors: Sadik Bayrakeri, Foster City, CA (US); Donald F. Gordon, Los Altos, CA (US); Edward A. Ludvig, Redwood City, CA (US); Eugene Gershtein, Redwood City, CA (US); Jeremy S. Edmonds, Castro Valley, CA (US); John P. Comito, Redwood City, CA (US); Alfred Li, Redwood City, CA (US)

(73) Assignee: Sedna Patent Services, LLC, Philadelphia, PA (US)

(*) Notice: Subject to any disclaimer, the term of this patent is extended or adjusted under 35 U.S.C. 154(b) by 0 days.

(21) Appl. No.: 09/524,854

(22) Filed: Mar. 14, 2000

Related U.S. Application Data (60) Provisional application No. 60/178,100, filed on Jan. 26, 2000.

(51) Int. Cl.
H04N 5/445 (2006.01)
H04N 7/173 (2006.01)

(52) U.S. Cl. .......................... 725/95; 725/38; 725/39; 725/98

(58) Field of Classification Search .................. 725/38, 725/39, 40, 46, 95, 98; 348/563, 569
See application file for complete search history.

(56) References Cited

U.S. PATENT DOCUMENTS

| | | | |
|---|---|---|---|
| 4,290,063 A | 9/1981 | Traster | 340/723 |
| 4,437,093 A | 3/1984 | Bradley | 340/726 |
| 4,496,976 A | 1/1985 | Swanson et al. | 358/147 |
| 4,520,356 A | 5/1985 | O'Keefe et al. | 340/750 |
| RE32,187 E | 6/1986 | Barda et al. | 340/706 |
| 4,600,921 A | 7/1986 | Thomas | 340/825.31 |
| 4,633,297 A | 12/1986 | Skerlos et al. | 358/22 |
| 4,706,121 A | 11/1987 | Young | 358/142 |
| 4,712,239 A | 12/1987 | Frezza et al. | 380/20 |
| 4,734,764 A | 3/1988 | Pocock et al. | 358/86 |
| 4,739,318 A | 4/1988 | Cohen | 340/750 |
| 4,742,344 A | 5/1988 | Nakagawa et al. | 340/723 |
| 4,745,468 A | 5/1988 | Von Kohorn | 358/84 |
| 4,751,578 A | 6/1988 | Reiter et al. | 358/183 |
| 4,792,848 A | 12/1988 | Nussrallah et al. | 358/86 |
| 4,792,849 A | 12/1988 | McCalley et al. | 358/86 |
| 4,829,372 A | 5/1989 | McCalley et al. | 358/86 |
| 4,829,569 A | 5/1989 | Seth-Smith et al. | 380/10 |
| 4,847,825 A | 7/1989 | Levine | 369/47 |

(Continued)

FOREIGN PATENT DOCUMENTS

EP 0 758 833 A 2/1997

(Continued)

Primary Examiner—Kieu-Oanh Bui
(74) Attorney, Agent, or Firm—Patterson & Sheridan, LLP (57) ABSTRACT

Methods for managing delivery of video sequences of an interactive program guide (IPG) over a communications network to a plurality of terminals are provided. In one embodiment, the method pre-allocates a broadcast bandwidth in the communications network for common video sequences to be transmitted by a broadcast technique. The common video sequences are transmitted in the broadcast bandwidth to the plurality of terminals by way of the broadcast technique. A request for a specific video sequence is received from a specific terminal via the communications network. A demandcast bandwidth is allocated in the communications network for the specific video sequence. The specific video sequence is transmitted in the demandcast bandwidth to the specific terminal via the communications network.

14 Claims, 10 Drawing Sheets

U.S. PATENT DOCUMENTS

| | | | |
|---|---|---|---|
| 4,860,123 A | 8/1989 | McCalley et al. | 358/342 |
| 4,866,770 A | 9/1989 | Seth-Smith et al. | 380/20 |
| 4,876,592 A | 10/1989 | Von Kohorn | 358/84 |
| 4,885,775 A | 12/1989 | Lucas | 380/10 |
| 4,890,321 A | 12/1989 | Seth-Smith et al. | 380/20 |
| 4,905,094 A | 2/1990 | Pocock et al. | 358/342 |
| 4,908,713 A | 3/1990 | Levine | 358/335 |
| 4,926,255 A | 5/1990 | Von Kohorn | 358/84 |
| 4,941,040 A | 7/1990 | Pocock et al. | 358/86 |
| 4,963,994 A | 10/1990 | Levine | 358/335 |
| 4,977,455 A | 12/1990 | Young | 358/142 |
| 4,991,011 A | 2/1991 | Johnson et al. | 358/141 |
| 4,994,908 A | 2/1991 | Kuban et al. | 358/86 |
| 5,014,125 A | 5/1991 | Pocock et al. | 358/86 |
| 5,034,807 A | 7/1991 | Von Kohorn | 358/84 |
| 5,038,211 A | 8/1991 | Hallenbeck | 358/142 |
| 5,057,915 A | 10/1991 | Von Kohorn | 358/84 |
| 5,058,160 A | 10/1991 | Banker et al. | 380/20 |
| 5,109,279 A | 4/1992 | Ando | 358/147 |
| 5,113,496 A | 5/1992 | McCalley et al. | 395/200 |
| 5,119,188 A | 6/1992 | McCalley et al. | 358/86 |
| 5,123,046 A | 6/1992 | Levine | 380/10 |
| 5,128,752 A | 7/1992 | Von Kohorn | 358/84 |
| 5,146,210 A | 9/1992 | Heberle | 340/709 |
| 5,151,789 A | 9/1992 | Young | 358/194.1 |
| 5,191,410 A | 3/1993 | McCalley et al. | 358/86 |
| 5,195,092 A | 3/1993 | Wilson et al. | 370/94.2 |
| 5,208,665 A | 5/1993 | McCalley et al. | 358/86 |
| 5,227,874 A | 7/1993 | Von Kohorn | 358/84 |
| 5,231,665 A | 7/1993 | Auld et al. | 380/20 |
| 5,239,540 A | 8/1993 | Rovira et al. | 370/77 |
| 5,247,364 A | 9/1993 | Banker et al. | 358/191.1 |
| 5,249,044 A | 9/1993 | Von Kohorn | 358/86 |
| 5,260,778 A | 11/1993 | Kauffman et al. | 358/86 |
| 5,270,809 A | 12/1993 | Gammie et al. | 358/84 |
| 5,283,734 A | 2/1994 | Von Kohorn | 364/412 |
| 5,293,357 A | 3/1994 | Hallenbeck | 348/734 |
| 5,297,204 A | 3/1994 | Levine | 380/10 |
| 5,301,028 A | 4/1994 | Banker et al. | 348/570 |
| 5,303,295 A | 4/1994 | West et al. | 380/10 |
| 5,307,173 A | 4/1994 | Yuen et al. | 358/335 |
| 5,319,454 A | 6/1994 | Schutte | 348/5.5 |
| 5,319,707 A | 6/1994 | Wasilewski et al. | 380/14 |
| 5,335,079 A | 8/1994 | Yuen et al. | 358/335 |
| 5,353,121 A | 10/1994 | Young et al. | 348/563 |
| 5,365,282 A | 11/1994 | Levine | 348/734 |
| 5,373,330 A | 12/1994 | Levine | 348/734 |
| 5,382,983 A | 1/1995 | Kwoh et al. | 348/716 |
| 5,400,401 A | 3/1995 | Wasilewski et al. | 380/9 |
| 5,406,558 A | 4/1995 | Rovira et al. | 370/77 |
| 5,414,448 A | 5/1995 | Wada et al. | 345/194 |
| 5,414,756 A | 5/1995 | Levine | 379/67 |
| 5,420,647 A | 5/1995 | Levine | 348/734 |
| 5,422,674 A | 6/1995 | Hooper et al. | 348/409 |
| 5,428,404 A | 6/1995 | Ingram et al. | 348/726 |
| 5,438,370 A | 8/1995 | Primiano et al. | 348/476 |
| 5,440,632 A | 8/1995 | Bacon et al. | 380/20 |
| 5,473,609 A | 12/1995 | Chaney | 370/94.1 |
| 5,473,704 A | 12/1995 | Abe | 382/235 |
| 5,475,382 A | 12/1995 | Yuen et al. | 340/825.72 |
| 5,477,262 A | 12/1995 | Banker et al. | 348/7 |
| 5,479,266 A | 12/1995 | Young et al. | 358/355 |
| 5,479,268 A | 12/1995 | Young et al. | 358/335 |
| 5,481,542 A * | 1/1996 | Logston et al. | 725/131 |
| 5,485,221 A | 1/1996 | Banker et al. | 348/563 |
| 5,488,409 A | 1/1996 | Yuen et al. | 348/5 |
| 5,493,339 A | 2/1996 | Birch et al. | 348/461 |
| 5,502,504 A | 3/1996 | Marshall et al. | 348/565 |
| 5,508,815 A | 4/1996 | Levine | 358/335 |
| 5,515,173 A | 5/1996 | Mankovitz et al. | 358/335 |
| 5,523,794 A | 6/1996 | Mankovitz et al. | 348/460 |
| 5,523,796 A | 6/1996 | Marshall et al. | 348/589 |
| 5,526,034 A | 6/1996 | Hoarty et al. | |
| 5,532,732 A | 7/1996 | Yuen et al. | 348/1 |
| 5,532,754 A | 7/1996 | Young et al. | 348/569 |
| 5,539,391 A | 7/1996 | Yuen | 340/825.72 |
| 5,539,822 A | 7/1996 | Lett | 380/20 |
| 5,543,852 A | 8/1996 | Yuen et al. | 348/478 |
| 5,550,576 A | 8/1996 | Klosterman | 348/6 |
| 5,552,837 A | 9/1996 | Mankovitz | 348/734 |
| 5,553,123 A | 9/1996 | Chan et al. | 379/102 |
| 5,559,550 A | 9/1996 | Mankovitz | 348/6 |
| 5,559,870 A | 9/1996 | Patton et al. | 379/107 |
| 5,568,272 A | 10/1996 | Levine | 386/48 |
| 5,579,055 A | 11/1996 | Hamilton et al. | 348/476 |
| 5,579,057 A | 11/1996 | Banker et al. | 348/589 |
| 5,581,614 A | 12/1996 | Ng et al. | 380/20 |
| 5,589,892 A | 12/1996 | Knee et al. | 348/731 |
| 5,592,551 A | 1/1997 | Lett et al. | 380/20 |
| 5,600,378 A | 2/1997 | Wasilewski et al. | 348/468 |
| 5,600,711 A | 2/1997 | Yuen | 379/102 |
| 5,604,528 A | 2/1997 | Edwards et al. | 348/5.5 |
| 5,619,247 A | 4/1997 | Russo | 348/3 |
| 5,619,274 A | 4/1997 | Roop et al. | 348/461 |
| 5,619,383 A | 4/1997 | Ngai | 360/20 |
| 5,621,579 A | 4/1997 | Yuen | 386/121 |
| 5,630,119 A | 5/1997 | Aristides et al. | 395/601 |
| 5,644,354 A | 7/1997 | Thompson et al. | 348/13 |
| 5,659,367 A | 8/1997 | Yuen | 348/465 |
| 5,673,089 A | 9/1997 | Yuen et al. | 604/95 |
| 5,675,575 A | 10/1997 | Wall, Jr. et al. | 370/326 |
| 5,684,525 A | 11/1997 | Klosterman | 348/12 |
| 5,692,214 A | 11/1997 | Levine | 395/833 |
| 5,701,383 A | 12/1997 | Russo et al. | 386/46 |
| 5,710,601 A | 1/1998 | Marshall et al. | 348/564 |
| 5,715,515 A | 2/1998 | Akins, III et al. | 455/4.1 |
| 5,716,273 A | 2/1998 | Yuen | 463/29 |
| 5,724,203 A | 3/1998 | Kwoh et al. | 360/72.3 |
| 5,724,525 A | 3/1998 | Beyers, II et al. | 395/240 |
| 5,727,060 A | 3/1998 | Young | 380/10 |
| 5,731,844 A | 3/1998 | Rauch et al. | 348/563 |
| 5,734,589 A | 3/1998 | Kostreski et al. | 364/514 A |
| 5,751,282 A | 5/1998 | Girard et al. | 345/327 |
| 5,754,940 A | 5/1998 | Smith et al. | 455/5.1 |
| 5,757,416 A | 5/1998 | Birch et al. | 348/6 |
| 5,764,739 A | 6/1998 | Patton et al. | 379/106.03 |
| 5,771,064 A | 6/1998 | Lett | 348/10 |
| 5,784,095 A | 7/1998 | Robbins et al. | 348/6 |
| 5,790,198 A | 8/1998 | Roop et al. | 348/460 |
| 5,790,806 A | 8/1998 | Koperda | 395/200.82 |
| 5,801,753 A | 9/1998 | Eyer | 348/13 |
| 5,801,787 A | 9/1998 | Schein et al. | 348/569 |
| 5,805,204 A | 9/1998 | Thompson et al. | 348/13 |
| 5,808,608 A | 9/1998 | Young et al. | 345/327 |
| 5,809,204 A | 9/1998 | Young et al. | 386/83 |
| 5,812,205 A | 9/1998 | Milnes et al. | 348/460 |
| 5,818,438 A | 10/1998 | Howe et al. | 345/327 |
| 5,822,324 A * | 10/1998 | Kostresti et al. | |
| 5,828,420 A | 10/1998 | Marshall et al. | 348/564 |
| 5,828,945 A | 10/1998 | Klosterman | 455/4.2 |
| RE35,954 E | 11/1998 | Levine | 380/10 |
| 5,844,620 A | 12/1998 | Coleman | 348/461 |
| 5,850,218 A | 12/1998 | LaJoie et al. | 345/327 |
| 5,852,478 A | 12/1998 | Kwoh | 348/734 |
| 5,854,840 A | 12/1998 | Cannella, Jr. | 380/9 |
| 5,870,150 A | 2/1999 | Yuen | 348/553 |
| 5,870,474 A | 2/1999 | Wasilewski et al. | 380/21 |
| 5,880,768 A | 3/1999 | Lemmons | 348/1 |
| 5,892,508 A | 4/1999 | Howe et al. | 345/327 |
| 5,915,068 A | 6/1999 | Levine | 386/83 |
| 5,940,738 A | 8/1999 | Rao et al. | |

| | | | |
|---|---|---|---|
| 5,949,476 A | 9/1999 | Pocock et al. ............... 348/24 |
| 5,986,650 A * | 11/1999 | Ellis et al. .................. 725/40 |
| 5,991,799 A * | 11/1999 | Yen et al. |
| 6,262,722 B1 * | 7/2001 | Allison et al. |
| 6,481,012 B1 * | 11/2002 | Gordon et al. |
| 6,510,152 B1 * | 1/2003 | Gerszberg et al. |
| 6,584,153 B1 * | 6/2003 | Gordon et al. |
| 6,621,870 B1 * | 9/2003 | Gordon et al. ......... 375/240.28 |
| 2002/0012353 A1 * | 1/2002 | Gerszberg et al. |
| 2003/0052905 A1 * | 3/2003 | Gordon et al. |

FOREIGN PATENT DOCUMENTS

| EP | 0 921 682 A | 6/1999 |
|---|---|---|
| EP | 0 946 060 A | 9/1999 |
| EP | 01 90 5040 | 3/2006 |

* cited by examiner

FIG. 1

FIG. 2A
BROADCAST (PUSH) METHOD

FIG. 2B
BROADCAST (PUSH) TOPOLOGY

FIG. 3A

POINTCAST ( PULL OR DEMANDCAST ) METHOD

FIG. 3B

POINTCAST ( PULL OR DEMANDCAST) TOPOLOGY

NARROWCAST (PULL OR DEMANDCAST) METHOD

FIG. 5B

NARROWCAST (PULL OR DEMANDCAST) TOPOLOGY

FIG. 6A
POINTCAST SHARING METHOD

FIG. 6B
POINTCAST SHARING TOPOLOGY

BANDWIDTH MANAGEMENT TECHNIQUES FOR DELIVERY OF INTERACTIVE PROGRAM GUIDE

RELATED APPLICATIONS

The present application is based on co-pending U.S. Provisional Patent Application Ser. No. 60/178,100, filed Jan. 26, 2000, inventors Sadik Bayrakeri and Donald F. Gordon, and entitled "BANDWIDTH MANAGEMENT TECHNIQUES FOR DELIVERY OF INTERACTIVE PROGRAM GUIDE."

BACKGROUND OF THE INVENTION

1. Field of the Invention

The invention relates to communications systems in general. More specifically, the invention relates to video communications systems and interactive program guides for video programming.

2. Description of the Background Art

Over the past few years, the television industry has seen a transformation in a variety of techniques by which its programming is distributed to consumers. Cable television systems are doubling or even tripling system bandwidth with the migration to hybrid fiber coax (HFC) cable plant. Customers unwilling to subscribe to local cable systems have switched in high numbers to direct broadcast satellite (DBS) systems. And, a variety of other approaches have been attempted focusing primarily on high bandwidth digital technologies, intelligent two way set top boxes, or other methods of trying to offer service differentiated from standard cable and over the air broadcast systems.

With this increase in bandwidth, the number of programming choices has also increased. Leveraging off the availability of more intelligent set top boxes, several companies such as Starsight Telecast Inc. and TV Guide, Inc. have developed elaborate systems for providing an interactive listing of a vast array of channel offerings, expanded textual information about individual programs, the ability to look forward to plan television viewing as much as several weeks in advance, and the option of automatically programming a VCR to record a future broadcast of a television program.

Unfortunately, the existing program guides have several drawbacks. They tend to require a significant amount of memory, some of them needing upwards of one megabyte of memory at the set top terminal (STT). They are very slow to acquire their current database of programming information when they are turned on for the first time or are subsequently restarted (e.g., a large database may be downloaded to a STT using only a vertical blanking interval (VBI) data insertion technique). Disadvantageously, such slow database acquisition may result in out of date database information or, in the case of a pay per view (PPV) or video on demand (VOD) system, limited scheduling flexibility for the information provider.

The use of compression techniques to reduce the amount of data to be transmitted may increase the speed of transmitting program guide information. In several communications systems, the data to be transmitted is compressed so that the available transmission bandwidth is used more efficiently. For example, the Moving Pictures Experts Group (MPEG) has promulgated several standards relating to digital data delivery systems. The first, known as MPEG-1 refers to ISO/IEC standards 11172 and is incorporated herein by reference. The second, known as MPEG-2, refers to ISO/IEC standards 13818 and is also incorporated herein by reference. A compressed digital video system is described in the Advanced Television Systems Committee (ATSC) digital television standard document A/53, and is incorporated herein by reference.

The above-referenced standards describe data processing and manipulation techniques that are well suited to the compression and delivery of video, audio and other information using fixed or variable rate digital communications systems. In particular, the above-referenced standards, and other "MPEG-like" standards and techniques, compress, illustratively, video information using intra-frame coding techniques (such as run-length coding, Huffman coding and the like) and inter-frame coding techniques (such as forward and backward predictive coding, motion compensation and the like). Specifically, in the case of video processing systems, MPEG and MPEG-like video processing systems are characterized by prediction-based compression encoding of video frames with or without intra- and/or inter-frame motion compensation encoding.

However, the MPEG-1 and MPEG-2 standards have, in some instances, very strict elementary stream and transport stream formats, causing usage of extra bandwidth for certain applications. For example, if a number of interactive program guide (IPG) pages were created as video sequences, only limited number of pages could be encoded into a transport stream(s) at a specified bandwidth.

Therefore, it is desirable to provide techniques for more efficiently utilizing a limited and finite bandwidth for transmitting program guide video sequences to set-top terminals.

SUMMARY OF THE INVENTION

The present invention provides techniques for more efficient utilization of the finite bandwidth available for distribution of interactive program guide (IPG) video sequences. In this invention, novel systems and methods are introduced to provide bandwidth management to handle broadcast, narrowcast, pointcast, and "shared" pointcast streams in combination. Bandwidth management techniques in an end-to-end system play a key role in latency reduction and improving overall efficiency of the interactive system.

The present invention includes methods for managing delivery of video sequences for an IPG to a plurality of terminals. The methods comprise delivery by way of various techniques, including broadcasting, pointcasting, narrowcasting, and variants and combinations of those techniques.

One embodiment of the present invention is a method that includes the steps of: pre-allocating a broadcast bandwidth in the communications network for common video sequences to be transmitted by a broadcast technique; transmitting in the broadcast bandwidth the common video sequences to the plurality of terminals by way of the broadcast technique; receiving a request for a specific video sequence from a specific terminal via the communications network; allocating a demandcast bandwidth in the communications network for the specific video sequence; and transmitting in the demandcast bandwidth the specific video sequence to the specific terminal via the communications network.

BRIEF DESCRIPTION OF THE DRAWINGS

The teachings of the present invention can be readily understood by considering the following detailed description in conjunction with the accompanying drawings.

DESCRIPTION OF THE SPECIFIC EMBODIMENTS

Figure 1:
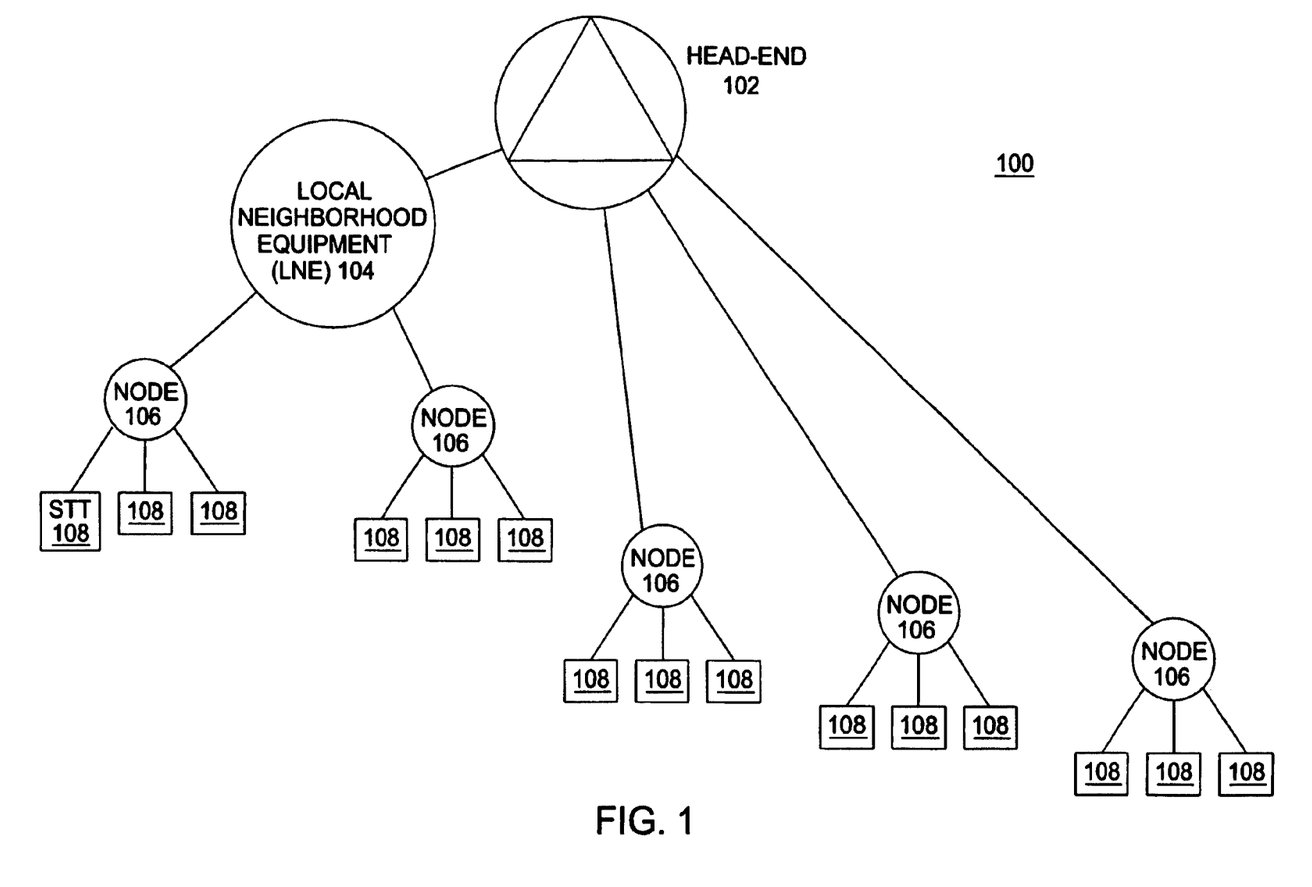
FIG. 1 depicts an illustrative communications network 100 for distributing video sequences to a plurality of terminals in accordance with an embodiment of the present invention.

FIG. 1 depicts an illustrative communications network 100 for distributing video sequences to a plurality of terminals in accordance with an embodiment of the present invention. The illustrative network 100 comprises a cable distribution network, but other types of distribution networks may also be used. The network 100 includes one or more head-ends 102, one or more centers for local neighborhood equipment 104, a plurality of distribution nodes 106, and a plurality of subscriber stations 108. The local neighborhood equipment (LNE) 104 may be located, for example, at remote hubs of a cable distribution network. The end-user terminals 108 may comprise, for example, interactive set-top terminals (STT) or other devices with similar interactive functionalities.

Figure 2A:
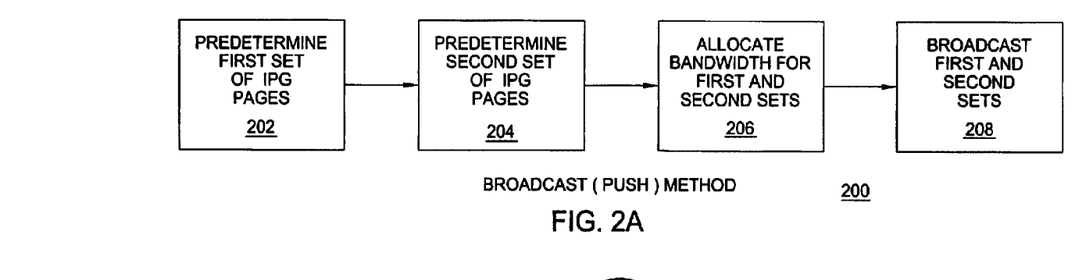
FIG. 2A is a flow chart showing a method 200 for broadcasting interactive program guide (IPG) pages in accordance with an embodiment of the present invention.

FIG. 2A is a flow chart showing a push method 200 for broadcasting interactive program guide (IPG) pages in accordance with an embodiment of the present invention. As described below, the method 200 includes four steps.

In a first step 202, a first set of IPG pages to be broadcast are predetermined. The first set of IPG pages may comprise video sequences, for example, for a current time period. For instance, if the current time is 1:07 pm, then the current time period may include programming from 1:00 pm to 2:30 pm, assuming a 90 minute time period.

In a second step 204, a second set of IPG pages to be broadcast are predetermined. The second set of IPG pages may comprise video sequences, for example, for a prime time period. Such a prime time period is a time period during which a large number of viewers typically watch TV programming. For example, the prime time period may include programming from 6:00 pm to 9:00 pm.

In a third step 206, bandwidth to broadcast the first and second sets of IPG pages is allocated in the distribution system for that purpose. For example, as described below in relation to FIGS. 7 and 8, a bandwidth manager (BWM) within a head-end 102 and/or local neighborhood equipment 104 allocates within the in-band network the necessary bandwidth to broadcast the first and second sets of IPG pages to the set-top terminals (STT) 108. If the first and second sets overlap, then only the non-redundant video sequences need to be broadcast and so only enough bandwidth to broadcast the non-redundant video sequences needs to be allocated. Such a situation may happen, for example, when the current time period is within prime time.

In a fourth step 208, the IPG pages of the first and second sets are broadcast to set-top terminals (STT) 108 within the broadcast range. The broadcast range may comprise all terminals 108 downstream from the head-end 102 or local neighborhood equipment 104. Only the non-redundant content needs to be broadcast. The broadcast is performed within the allocated in-band bandwidth.

Figure 2B:
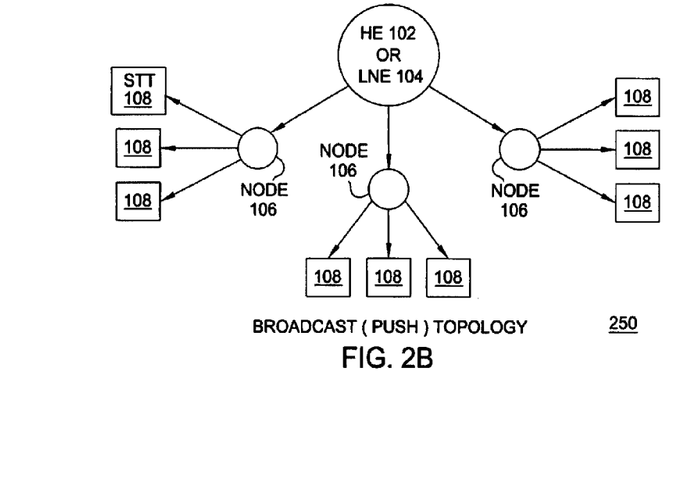
FIG. 2B depicts a topology 250 for broadcasting IPG pages in accordance with an embodiment of the present invention.

FIG. 2B depicts a topology 250 for broadcasting IPG pages in accordance with an embodiment of the present invention. The topology 250 relates to the push method 200 of FIG. 2A. As shown in FIG. 2B, the IPG pages are transmitted from the head-end (HE) 102 or local neighborhood equipment (LNE) 104 downstream within the illustrative communications network 100. As shown in FIG. 2B, the broadcast is pushed from the HE 102 or LNE 104 to the distribution nodes 106 and finally to the multitude of set-top terminals 108.

Figure 3A:
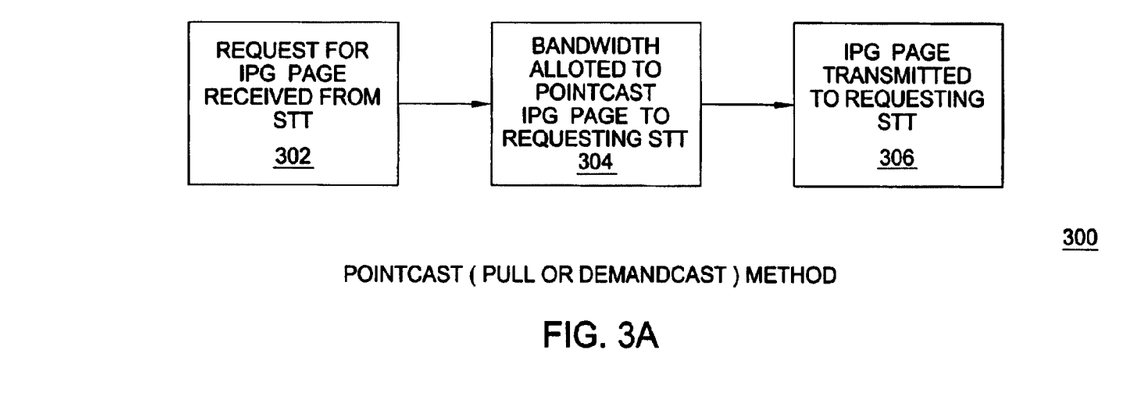
FIG. 3A is a flow chart showing a method 300 for pointcasting IPG pages in accordance with an embodiment of the present invention.

FIG. 3A is a flow chart showing a pull method 300 for pointcasting IPG pages in accordance with an embodiment of the present invention. As described below, the method 300 includes three steps.

In a first step 302, a request for an IPG page is received from a STT 108. The request is transmitted upstream from the STT 108 to the HE 102 or LNE 104 by way of the communications network 100. The upstream transmission may be done via an out-of-band network. Alternatively, the upstream transmission may be done via an in-band network. Such a request may comprise, for example, a look ahead request where a user wishes to view programming for a time period ahead of the current time period. For a system where a set or sets of IPG pages are already being broadcast per FIGS. 2A and 2B, the STT 108 may first check to see whether or not the requested IPG page is already being broadcast before transmitting the request upstream.

In a second step 304, bandwidth to pointcast the requested IPG page is allocated in the distribution system for that purpose. For example, as described below in relation to FIGS. 7 and 8, a bandwidth manager (BWM) within a head-end 102 and/or local neighborhood equipment 104 allocates within the in-band network the necessary bandwidth to pointcast the requested IPG page to the requesting STT 108. If the requested IPG page is already being broadcast per FIGS. 2A and 2B, then no additional bandwidth for a pointcast need be allocated.

In a third step 306, the requested IPG page is pointcast to the requesting set-top terminal (STT) 108. The pointcast need only be received by the requesting STT 108 and does not need to be received by other STTs 108. The pointcast is sent downstream from the head-end 102 or local neighborhood equipment 104 to the requesting STT 108. The pointcast is performed within the allocated in-band bandwidth. If the requested IPG page is already being broadcast per FIGS. 2A and 2B, then the pointcast need not be performed.

Figure 3B:
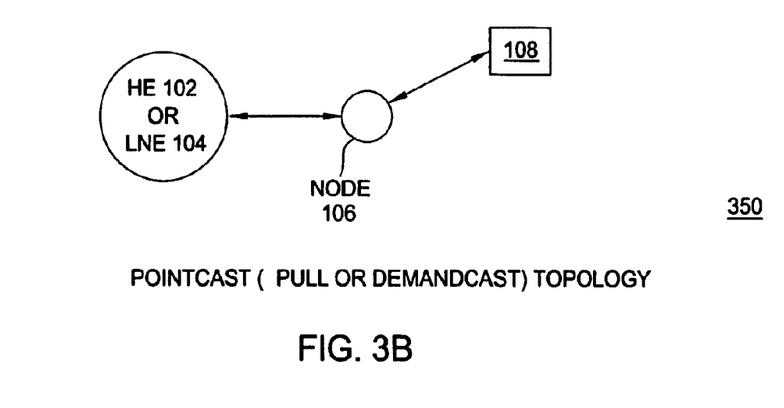
FIG. 3B depicts a topology 350 for pointcasting IPG pages in accordance with an embodiment of the present invention.

FIG. 3B depicts a topology 350 for pointcasting IPG pages in accordance with an embodiment of the present invention. The topology 350 relates to the pull method 300 of FIG. 3A. As shown in FIG. 3B, the request is transmitted upstream from the requesting STT 108 to the HE 102 or LNE 104 via illustrative communications network 100. Subsequently, the requested IPG page is pointcast downstream from the HE 102 or LNE 104 to the requesting STT 108 via the network 100.

Figure 4A:
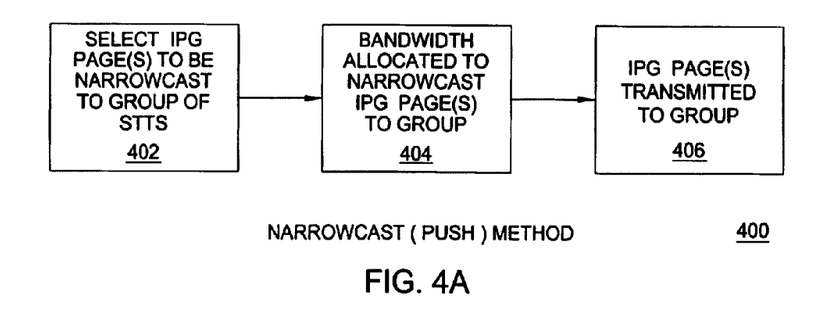
FIG. 4A is a flow chart showing a push method 400 for narrowcasting IPG pages in accordance with an embodiment of the present invention.

FIG. 4A is a flow chart showing a push method 400 for narrowcasting an IPG page (or multiple IPG pages) in accordance with an embodiment of the present invention. As described below, the method 400 includes three steps.

In a first step 402, an IPG page is selected to be narrowcast to a group 452 of terminals 108. For example, the group of terminals may be a group comprising a high concentration of users with a particular ethnicity or special interest, and the IPG page selected may comprise programming targeted to that ethnic group or special interest group. As another example, the group of terminals may comprise terminals 108 in a school campus or business, and the IPG page selected may comprise class instruction or other targeted material. The group 452 may include terminals 108 in one geographic area or terminals 108 dispersed among different geographic areas but linked, for example, via a network group address.

In a second step 404, bandwidth to narrowcast the selected IPG pages is allocated in the distribution system for that purpose. For example, as described below in relation to FIGS. 7 and 8, a bandwidth manager (BWM) within a head-end 102 and/or local neighborhood equipment 104 allocates within the in-band network the necessary bandwidth to narrowcast the selected IPG page to the group 452 of terminals 108. If the requested IPG page is already being broadcast per FIGS. 2A and 2B, then no additional bandwidth for a narrowcast need be allocated.

In a third step 406, the selected IPG page is narrowcast to the group of terminals 108. The narrowcast need only be received by terminals 108 within the group 452 and does not need to be received by other STTs 108. The narrowcast is sent downstream from the head-end 102 or local neighborhood equipment 104 to the group 452 of terminals 108. The narrowcast is performed within the allocated in-band bandwidth. If the requested IPG page is already being broadcast per FIGS. 2A and 2B, then the narrowcast need not be performed.

Figure 4B:
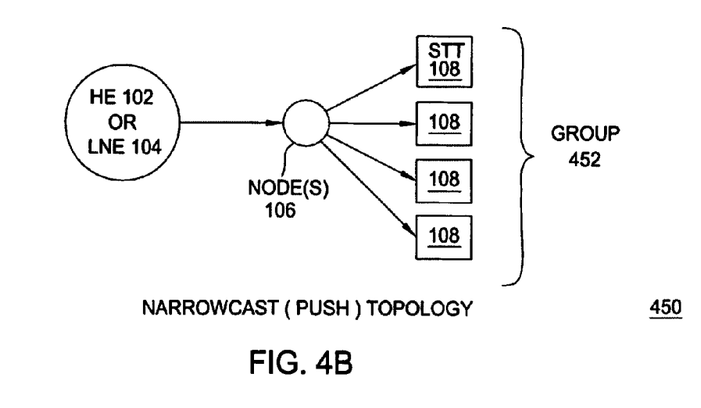
FIG. 4B depicts a push topology 450 for narrowcasting IPG pages in accordance with an embodiment of the present invention.

FIG. 4B depicts a push topology 450 for narrowcasting IPG pages in accordance with an embodiment of the present invention. The topology 450 relates to the push method 400 of FIG. 4A. As shown in FIG. 4B, the IPG page is transmitted from the head-end (HE) 102 or local neighborhood equipment (LNE) 104 downstream within the illustrative communications network 100. As shown in FIG. 4B, the narrowcast is pushed from the HE 102 or LNE 104 to one or more distribution nodes 106 and finally to the terminals 108 within the group 452.

Figure 5A:
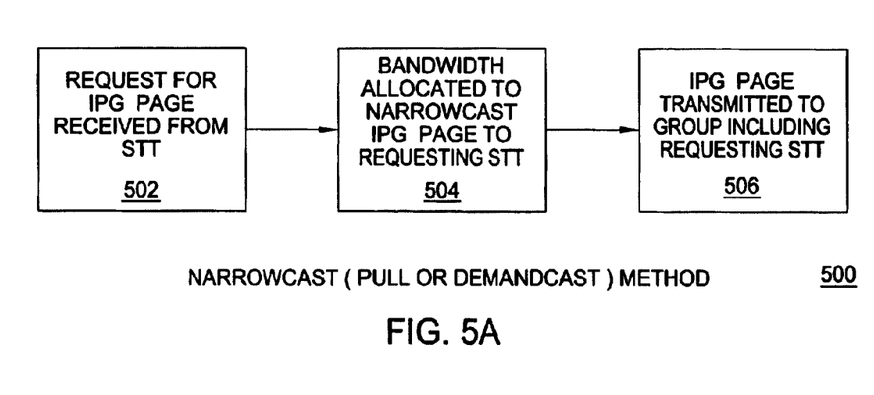
FIG. 5A is a flow chart showing a pull or demandcast method 500 for narrowcasting IPG pages in accordance with an embodiment of the present invention.

FIG. 5A is a flow chart showing a pull or demandcast method 500 for narrowcasting IPG pages in accordance with an embodiment of the present invention. As described below, the method 500 includes three steps.

In a first step 502, a request for an IPG page is received from a requesting STT 552. The request is transmitted upstream from the requesting STT 552 to the HE 102 or LNE 104 by way of the communications network 100. The upstream transmission may be done via an out-of-band network. Alternatively, the upstream transmission may be done via an in-band network. Such a request may comprise, for example, a look ahead request where a user wishes to view available special interest programming for a time period ahead of the current time period. For a system where a set or sets of IPG pages are already being broadcast per FIGS. 2A and 2B, the requesting STT 552 may first check to see whether or not the requested IPG page is already being broadcast before transmitting the request upstream.

In a second step 504, bandwidth to narrowcast the requested IPG page is allocated in the distribution system for that purpose. For example, as described below in relation to FIGS. 7 and 8, a bandwidth manager (BWM) within a head-end 102 and/or local neighborhood equipment 104 allocates within the in-band network the necessary bandwidth to narrowcast the requested IPG page to a group 554 of terminals which includes the requesting STT 552. If the requested IPG page is already being broadcast per FIGS. 2A and 2B, then no additional bandwidth for a pointcast need be allocated. The group 554 may include terminals 108 in one geographic area or terminals 108 dispersed among different geographic areas but linked, for example, via a network group address.

In a third step 506, the requested IPG page is narrowcast to the group 554 of terminals 108. The narrowcast need only be received by terminals 108 within the group 554 and does not need to be received by other STTs 108. The narrowcast is sent downstream from the head-end 102 or local neighborhood equipment 104 to the group 554 of terminals 108. The narrowcast is performed within the allocated in-band bandwidth. If the requested IPG page is already being broadcast per FIGS. 2A and 2B, then the narrowcast need not be performed.

Figure 5B:
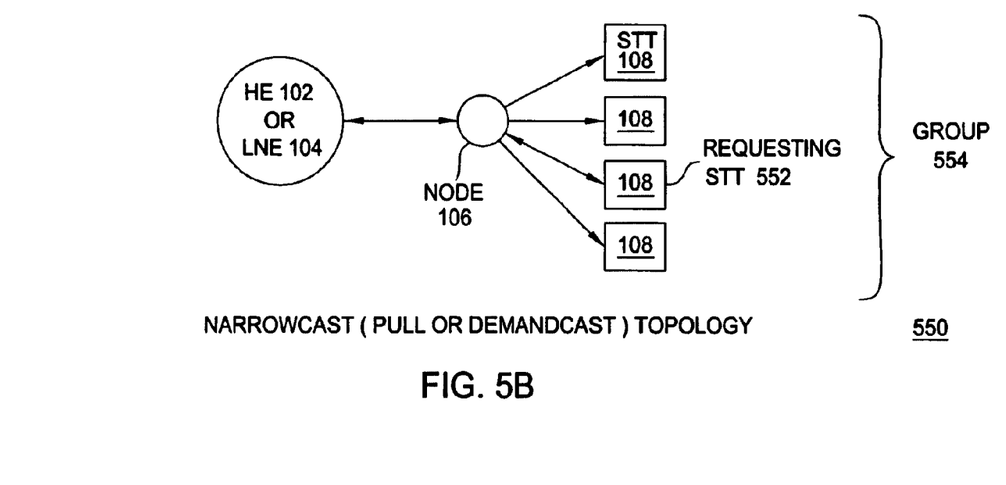
FIG. 5B depicts a pull or demandcast topology 550 for narrowcasting IPG pages in accordance with an embodiment of the present invention.

FIG. 5B depicts a pull or demandcast topology 550 for narrowcasting IPG pages in accordance with an embodiment of the present invention. The topology 550 relates to the pull method 500 of FIG. 5A. As shown in FIG. 5B, the request is transmitted upstream from the requesting STT 552 to the HE 102 or LNE 104 via illustrative communications network 100. Subsequently, the requested IPG page is narrowcast downstream from the HE 102 or LNE 104 to the group 554 which includes the requesting STT 108 via the network 100.

Figure 6A:
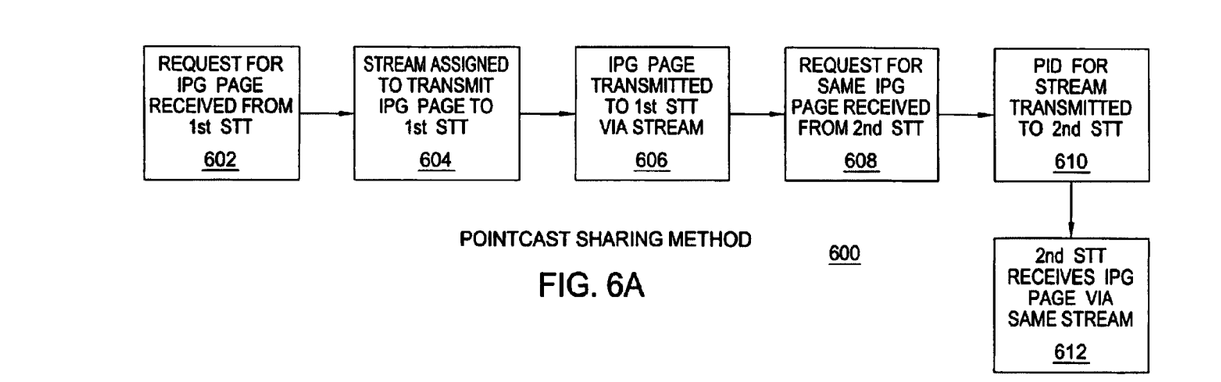
FIG. 6A is a flow chart showing a method 600 for shared pointcasting of IPG pages in accordance with an embodiment of the present invention.

FIG. 6A is a flow chart showing a method 600 for shared pointcasting of IPG pages in accordance with an embodiment of the present invention. As described below, the method 600 includes five steps.

In a first step 602, a request for an IPG page is received from a first STT 652. The request is transmitted upstream from the first STT 652 to the HE 102 or LNE 104 by way of the communications network 100. The upstream transmission may be done via an out-of-band network. Alternatively, the upstream transmission may be done via an in-band network. Such a request may comprise, for example, a look ahead request where a user wishes to view programming for a time period ahead of the current time period. For a system where a set or sets of IPG pages are already being broadcast per FIGS. 2A and 2B, the first STT 652 may first check to see whether or not the requested IPG page is already being broadcast before transmitting the request upstream.

In a second step 604, a stream 656 is assigned to pointcast the requested IPG page is allocated in the distribution system for that purpose. For example, as described below in relation to FIGS. 7 and 8, a bandwidth manager (BWM) within a head-end 102 and/or local neighborhood equipment 104 assigns the stream 656 to pointcast the requested IPG page to the first STT 652. The stream assignment may be made, for example, by assigning a particular value to the program identifier (PID) for the stream 656. If the requested IPG page is already being broadcast per FIGS. 2A and 2B, then the stream assignment need not be made.

In a third step 606, the requested IPG page is pointcast to the first STT 652 via the assigned stream 656. This may be done by transmitting packets that are identified by the particular PID value and contain the video sequence of the requested IPG page. The pointcast need only be received by the first STT 652 and does not need to be received by other STTs 108. The pointcast is sent downstream from the head-end 102 or local neighborhood equipment 104 to the first STT 652. If the requested IPG page is already being broadcast per FIGS. 2A and 2B, then the pointcast need not be performed.

In a fourth step 608, a request for an IPG page is received from a second STT 654, where the IPG page requested is the same IPG page as the one requested by the first STT 652 in the first step 602. Like the first request, this second request is transmitted upstream from the second STT 654 to the HE 102 or LNE 104 by way of the communications network 100 via either an out-of-band network or via an in-band network. The second STT 654 may be either in the same geographic area as the first STT 652, or the second STT 654 may be in a different geographic area as the first STT 652.

Either way, in a fifth step 610, the identifier (e.g., PID value) for the stream 656 is transmitted from the HE 102 or LNE 104 to the second STT 654. This enables the next step 612 to occur without use of additional PIDs or additional network bandwidth.

Finally, in a sixth step 612, the second STT 654 receives the requested IPG page via the same stream 656 as that which delivers the IPG page to the first STT 652. This may be done, for example, by setting the second STT 654 to decode and present packets that are identified by the particular PID value for the stream 656. Such packets are the ones which contain the video sequence of the requested IPG page. In this manner, "sharing" of the stream 656 occurs, changing the previously "single" pointcast to a "double" pointcast.

Similarly, additional terminals 108 may "share" the pointcast by requesting the same IPG page and receiving it via the same stream 656. In this way, any number of terminals 108 may share the pointcast. This results in more efficient use of limited bandwidth.

Figure 6B:
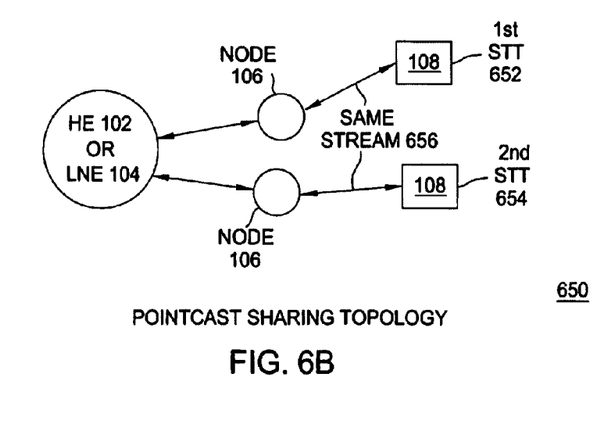
FIG. 6B depicts a pull or demandcast topology 650 for shared pointcasting of IPG pages in accordance with an embodiment of the present invention.

FIG. 6B depicts a pull or demandcast topology 650 for shared pointcasting of IPG pages in accordance with an embodiment of the present invention. The topology 650 relates to the pointcast "sharing" method 600 of FIG. 6A. As shown in FIG. 6B, a request is transmitted upstream from the first STT 652 to the HE 102 or LNE 104 via illustrative communications network 100. In response, the requested IPG page is pointcast by way of a stream 656 from the HE 102 or LNE 104 to the first STT 652. Next, a second request for the same IPG page is transmitted upstream from the second STT 654 to the HE 102 or LNE 104 via the network 100. In response, the identifier for the stream 656 is transmitted from the HE 102 or LNE 104 to the second STT 654. Subsequently, the second STT 654 uses the identifier to receive the IPG page from that same stream 656.

Figure 6C:
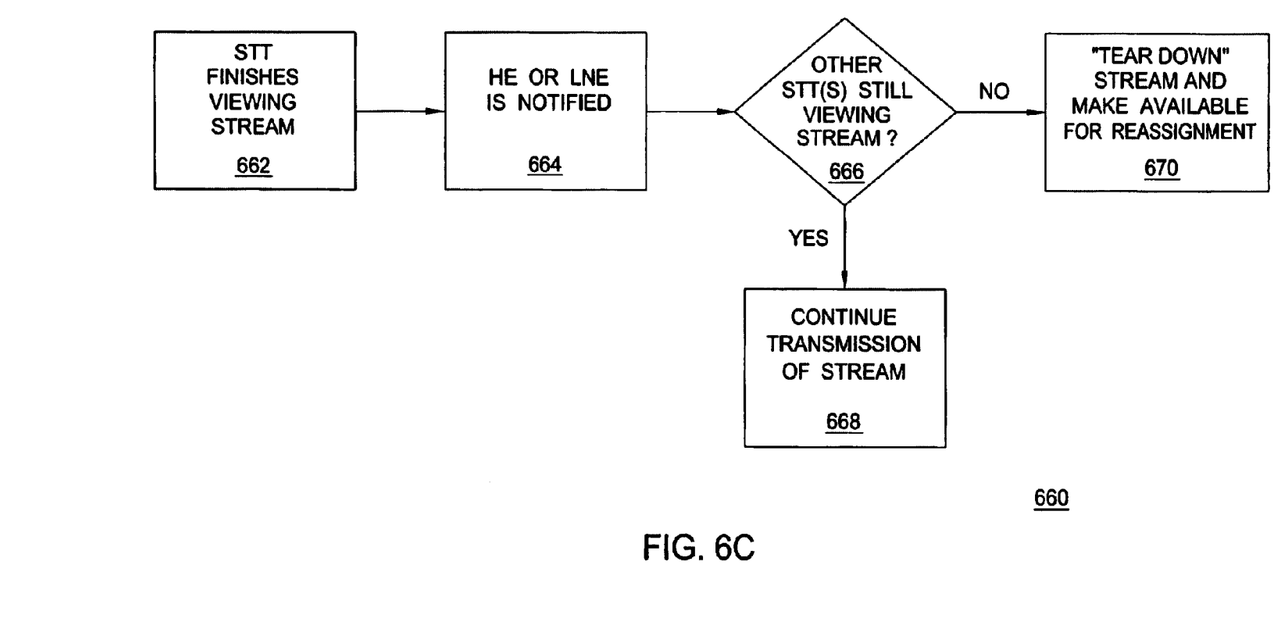
FIG. 6C is a flow chart showing a method 660 of terminating (or continuing) shared pointcasts of IPG pages in accordance with an embodiment of the present invention.

FIG. 6C is a flow chart showing a method 660 of terminating (or continuing) shared pointcasts of IPG pages in accordance with an embodiment of the present invention. As described below, the method 660 includes five steps.

In a first step 662, an STT finishes viewing a stream which transmits an IPG page. In the example discussed above with respect to FIGS. 6A and 6B, the STT may be either the first STT 652 or the second STT 654. In general, the STT may be any of multiple terminals which are sharing the stream, or the STT may be the last terminal to be viewing a stream which was previously shared.

In a second step 664, the HE 102 or LNE 104 is notified that the STT has finished viewing the stream. Such a notification occurs by the STT sending a communication upstream to the HE 102 or LNE 104 by way of an out-of-band or in-band network.

In a third step 666, a determination is made as to whether or not that stream is still being viewed by one or more STTs. This determination is done within the HE 102 or LNE 104 and may be done by a bandwidth manager 728 or 828 in conjunction with a session manager 724 or 824.

In a fourth step 668, if one or more STTs are still viewing that stream, then transmission of the stream by the HE 102 or LNE 104 continues. Such transmission is typically performed by the in-band delivery system 728 or 828 within the HE 102 or LNE 104.

Finally, in a fifth step 670, if no more STTs are still viewing that stream, then the stream is "torn down" so that it is no longer transmitted and no longer takes up network bandwidth. The torn down stream is made available for reassignment to reuse the bandwidth to transmit a different pointcast, narrowcast, or broadcast.

Figure 7:
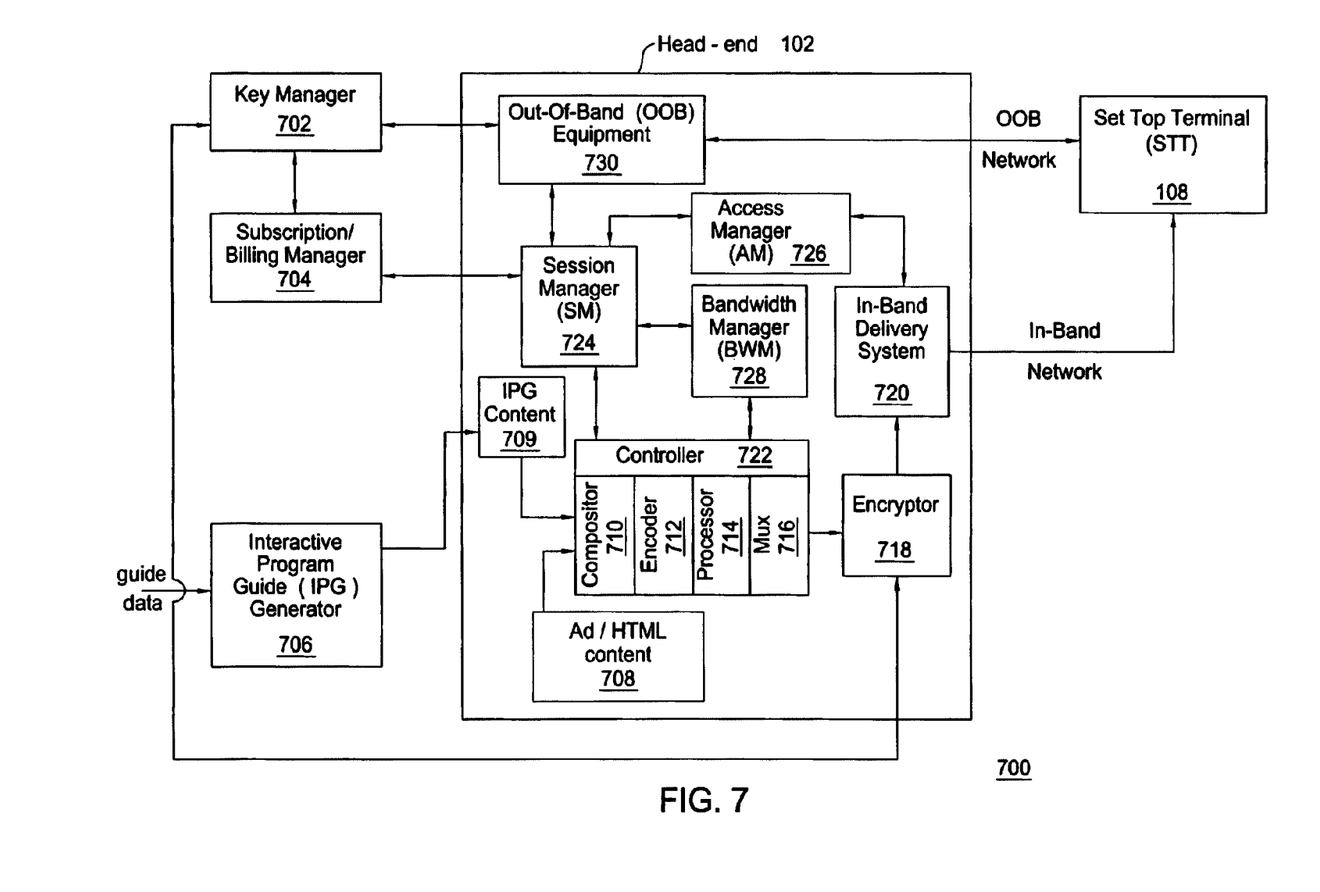
FIG. 7 depicts a first system 700 for managing delivery of video sequences of an interactive program guide in accordance with an embodiment of the present invention.

FIG. 7 depicts a first system 700 for managing delivery of video sequences of an interactive program guide in accordance with an embodiment of the present invention. The first system 700 includes a key manager 702, a subscription/billing manager 704, an IPG generator 706, and a head-end 102.

The head-end 102 is coupled to a multitude of STTs 108 by way of both an in-band network and an out-of-band (OOB) network. The head-end 102 includes various components which are coupled together and interact with each other. The head-end 102 illustrated includes an advertising/html content source 708, an IPG content source 709, a compositor 710, an encoder 712, a processor 714, a multiplexor 716, an encryptor 718, an in-band delivery system 720, a controller 722, a session manager 724, an access manager 726, a bandwidth manager 728, and out-of-band (OOB) equipment 730.

Figure 8:
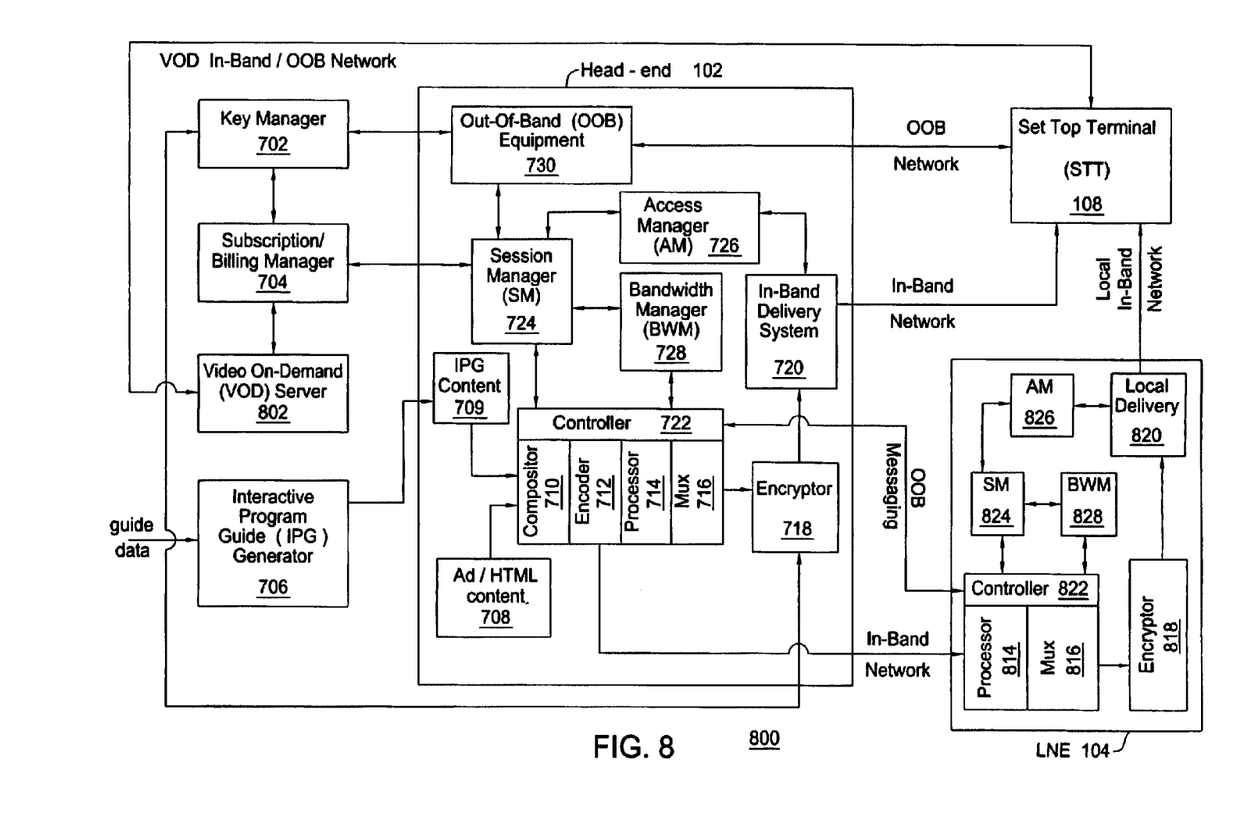
FIG. 8 depicts a second system 800 for managing delivery of video sequences of an interactive program guide in accordance with an embodiment of the present invention.

FIG. 8 depicts a second system 800 for managing delivery of video sequences of an interactive program guide in accordance with an embodiment of the present invention. The second system 800 includes the components of the first system 700. In addition, the second system 800 includes local neighborhood equipment 104 and a video-on-demand (VOD) server 802.

The LNE 104 is coupled to the HE 102 by way of an in-band network and an OOB messaging system. The LNE 104 is also coupled to a multitude of STTs 108 by way of a local in-band network. The LNE 104 includes various components which are coupled together and interact with each other. The type of components in the LNE 104 are typically a subset of the type of components in the HE 102. The LNE 104 illustrated includes a processor 814, a multiplexor 816, an encryptor 818, a local delivery system 820, a controller 822, a session manager (SM) 824, an access manager (AM) 826, and a bandwidth manager (BWM) 828.

The first and second systems 700 and 800 described above are illustrative systems which may be used to implement the present invention. They are not meant to limit the present invention to those specific embodiments.

Figure 9:
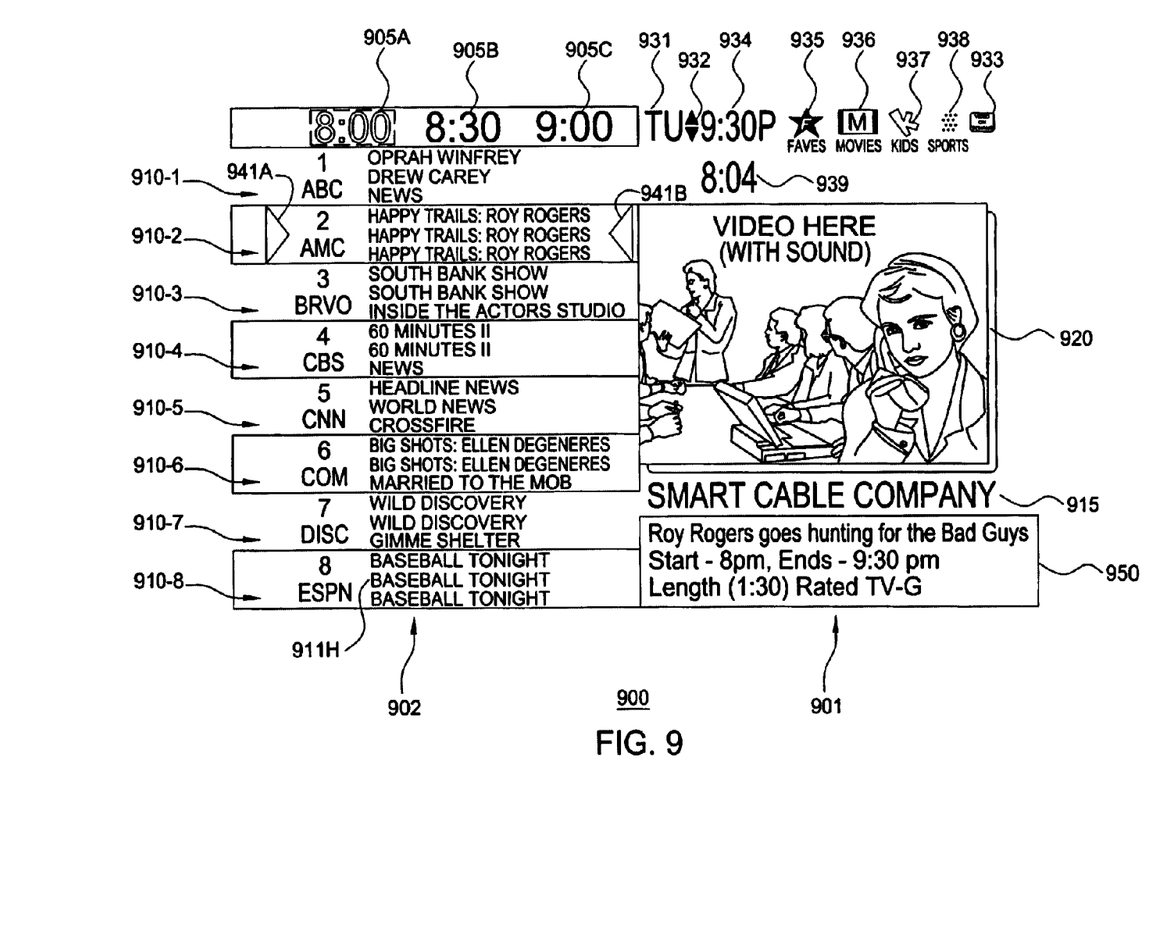
FIG. 9 depicts an example of one frame taken from a video sequence that can be encoded using the present invention.

FIG. 9 depicts an example of one frame taken from a video sequence of an IPG page in accordance with the present invention. The IPG page 900 of FIG. 9 comprises a first 905A, second 905B and third 905C time slot objects, a plurality of channel content objects 910-1 through 910-8, a pair of channel indicator icons 941A, 941B, a video barker 920 (and associated audio barker), a cable system or provider logo 915, a program description region 950, a day of the week identification object 931, a time of day object 939, a next time slot icon 934, a temporal increment/decrement object 932, a "favorites" filter object 935, a "movies" filter object 936, a "kids" (i.e., juvenile) programming filter icon 937, a "sports" programming filter object 938 and a VOD programming icon 933. It should be noted that the day of the week object 931 and next time slot icon 934 may comprise independent objects (as depicted in FIG. 9) or may be considered together as parts of a combined object.

In a system, illustratively, comprising 80 channels of information, the channels are displayed in 8-channel groups having associated with them three hour time slots. In this organization, it is necessary to provide 10 video PIDs to carry the present-time channel/time/title information, one or more audio PID to carry the audio barker and/or one or more data PID (or other data transport method) to carry the program description data, overlay data and the like. To fully broadcast interactive program information up to 24 hours in advance, it is necessary to provide 160 (10*24/1.5) video PIDS, along with one or more audio and, optionally, one or more data PIDs. The amount of time provided for in broadcast video PIDs for the given channel groups comprises the time depth of the program guide, while the number of channels available through the guide (compared to the number of channels in the system) provides the channel depth of the program guide. In a system providing only half of the available channels via broadcast video PIDs, the channel depth is said to be 50%. In a system providing 12 hours of time slot "look-ahead," the time depth is said to be 12 hours. In a system providing 16 hours of time slot "look-ahead" and 4 hours of time slot "look-back," the time depth is said to be +16/−4 hours.

The video streams representing the IPG are carried in a single transport stream or multiple transport streams, within the form of a single or multi-programs as discussed previously in this invention. A user desiring to view the next 1.5 hour time interval (e.g., 9:30–11:00) may activate a "scroll right" object (or move the joystick to the right when a program within program grid 902 occupies the final displayed time interval). Such activation results in the controller of the STT noting that a new time interval is desired. The video stream corresponding to the new time interval is then decoded and displayed. If the corresponding video stream is within the same transport stream (i.e., a new PID), then the stream is immediately decoded and presented. If the corresponding video stream is within a different transport stream, then the related transport stream is extracted from the broadcast stream and the related video stream is decoded and presented. If the corresponding transport stream is within a different broadcast stream, then the related broadcast stream is tuned, the corresponding transport stream is extracted, and the desired video stream is decoded and presented.

A user interaction resulting in a prior time interval or a different set of channels results in the retrieval and presentation of a related video stream. If the related video stream is not part of the broadcast video streams, then a pointcast session is initiated as described above in relation to FIGS. 3A and 3B. For this purpose, the STT sends a request to the head end via the back channel requesting a particular stream. The head end then processes the request, retrieves the related stream from the information server, incorporates the stream within a transport stream as a video PID (preferably, the transport stream currently being tuned/selected by the STT) and informs the STT which PID should be received, and from which transport stream it should be demultiplexed. The STT then retrieves the related video PID. In the case of the video PID being within a different transport stream, the STT first demultiplexes the corresponding transport stream (possibly tuning a different QAM stream within the forward channel).

Normally, upon completion of the viewing of the desired stream, the STT indicates to the head end that it no longer needs the stream, whereupon the head end tears down the pointcast session. The viewer is then returned to the broadcast stream from which the pointcast session was launched. However, as described above in relation to FIGS. 6A, 6B, and 6C, the method for "sharing" pointcasts may avoid the need to tear down the pointcast session if another STT is still utilizing the pointcast. In addition, the above described pointcast sharing technique more efficiently utilizes the network bandwidth allocated to pointcasts.

What is claimed is:

1. A method for managing delivery of video sequences of an interactive program guide (IPG) over a communications network to a plurality of terminals, the method comprising:
   pre-allocating a broadcast bandwidth in the communications network for common video sequences to be transmitted by a broadcast technique, said common video sequences comprising IPG pages for a current time period and IPG pages for a prime viewing time period;
   transmitting in the broadcast bandwidth the common video sequences to the plurality of terminals by way of the broadcast technique;
   receiving a request for a specific video sequence from a specific terminal via the communications network;
   allocating a demandcast bandwidth in the communications network for the specific video sequence; and
   transmitting in the demandcast bandwidth the specific video sequence to the specific terminal via the communications network;
   wherein transmitting the specific video sequence is performed using a narrowcast technique to a group of terminals that includes the specific terminal.

2. The method of claim 1, wherein the common video sequences are delivered using an in-band portion of the communications network.

3. The method of claim 2, wherein the specific video sequence is delivered using the in-band portion of the communications network.

4. The method of claim 3, wherein the requests are received using an out-of-band portion of the communications network.

5. The method of claim 1, wherein transmitting the specific video sequence is performed using a pointcast technique.

6. The method of claim 5, wherein the pointcast technique comprises a shared pointcast technique.

7. A method for managing delivery of a plurality of video sequences that comprise interactive program guide (IPG) pages, the method comprising:
predetermining a set of video sequences to be broadcast;
allocating a broadcast bandwidth within a network with a finite bandwidth for the set of video sequences;
broadcasting the set of video sequences via the broadcast bandwidth to a plurality of terminals;
receiving a request from a specific terminal for a specific video sequence that is not within the set of video sequences to be broadcast;
allocating a demandcast bandwidth within the network for the specific video sequence;
transmitting the specific video sequence via the demandcast bandwidth to the specific terminal to fulfill the request; and
predetermining a second set of video sequences to be broadcast, wherein the second set of video sequences comprises IPG pages for prime viewing time periods;
wherein transmitting the specific video sequence to the specific terminal comprises narrowcasting the specific video sequence to a group of terminals that includes the specific terminal.

8. The method of claim 7, wherein the broadcasting and transmitting occur by way of in-band communications in the network, and the receiving occurs by way of out-of-band communications in the network.

9. The method of claim 8, wherein the first set of video sequences comprises IPG pages for a current time period.

10. The method of claim 7, further comprising:
allocating a second broadcast bandwidth within the network for the second set of video sequences; and
broadcasting via the second broadcast bandwidth the second set of video sequences to the plurality of terminals.

11. The method of claim 7, further comprising:
predetermining a particular video sequence to be narrowcast to a group of terminals;
allocating a narrowcast bandwidth within the network for the particular video sequence; and
narrowcasting the particular video sequence via the narrowcast bandwidth to the group of terminals.

12. The method of claim 7, further comprising:
receiving a second request from a second specific terminal for the specific video sequence; and
transmitting the specific video sequence via the demandcast bandwidth to the second terminal,
wherein the demandcast bandwidth comprises a single stream which is used to transmit the specific video sequence to both terminals.

13. The method of claim 12, further comprising:
one terminal from a group including both terminals finishing use of the specific video sequence; and
continuing transmission of the specific video sequence via the demandcast bandwidth.

14. The method of claim 13, further comprising:
another terminal from the group finishing use of the specific video sequence; and
discontinuing transmission of the specific video sequence; and
making the demandcast bandwidth available for re-allocation.

* * * * *